United States Patent Office 3,425,385
Patented Feb. 4, 1969

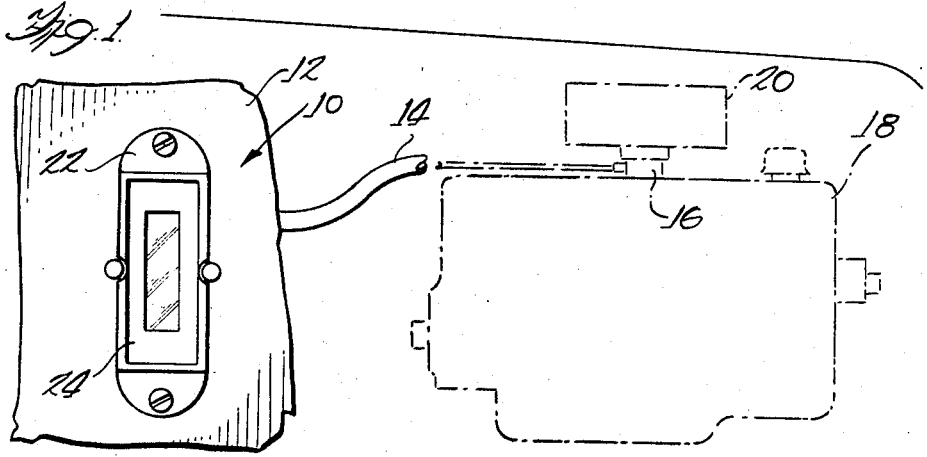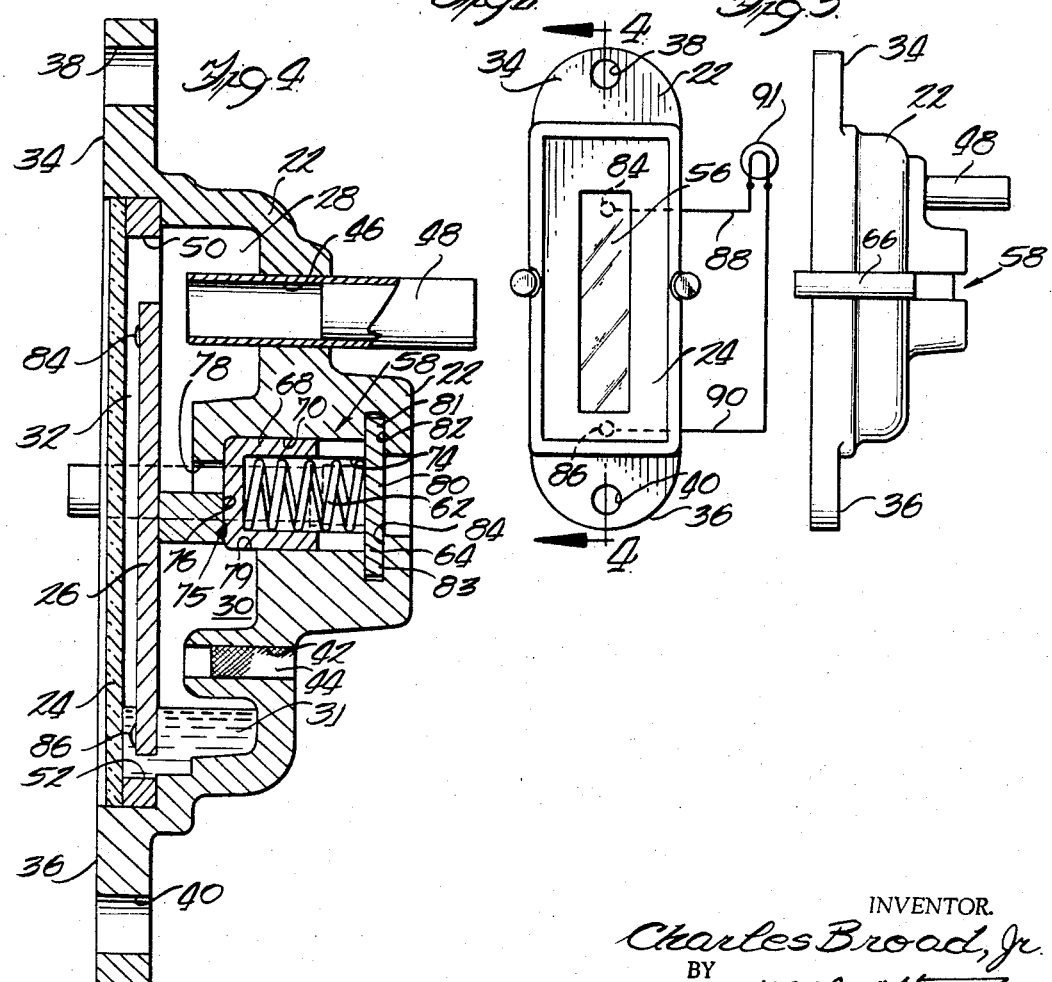

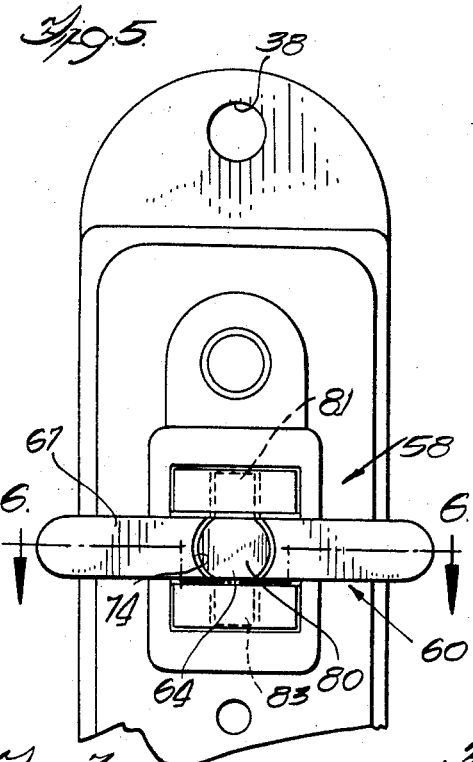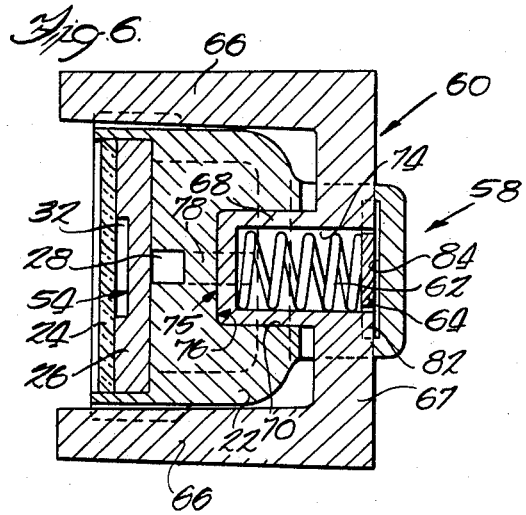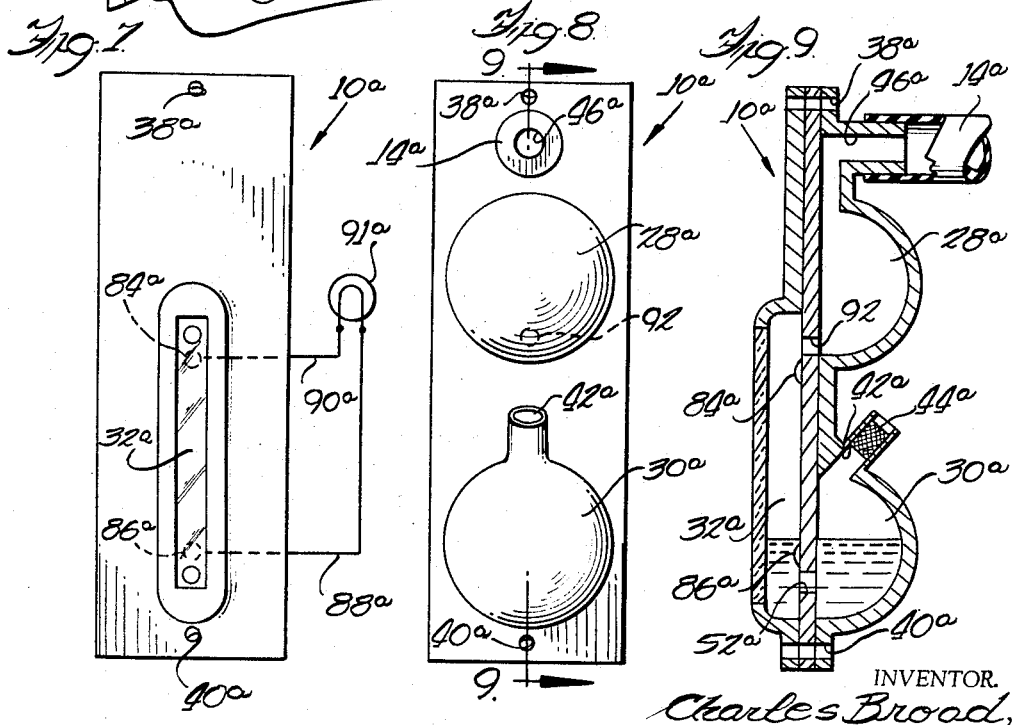

3,425,385
AIR RESTRICTION GAUGE
Charles Broad, Jr., Westchester, Ill., assignor to International Harvester Company, Chicago, Ill., a corporation of Delaware
Filed Dec. 4, 1964, Ser. No. 415,940
U.S. Cl. 116—70                                    8 Claims
Int. Cl. G01l 19/12, 19/06; H01h 29/28

ABSTRACT OF THE DISCLOSURE

A gauge to indicate air restriction by providing first and second chambers interconnected by a sight passageway with indicating fluid normally contained in one of the chambers. The other of the chambers is connected to an air system in which the restriction is to be gauged whereby a predetermined vacuum in the air system will draw fluid through the sight passageway into the second chamber. The second chamber is of sufficient capacity to retain the entire volume of indicating fluid to preclude withdrawal thereof into the air system.

---

This invention relates to an air restriction gauge and more particularly to an air restriction gauge that is suitable for use in determining air restrictions to the air induction system of internal combustion engines and compressors.

Dry paper air cleaners currently in use on many tractor engines to keep harmful abrasives out of the engine are relatively fragile and susceptible to damage in the hands of a tractor operator attempting to determine visually whether or not the air cleaner is clogged and needs replacement. Further, it is not generally possible to determine by a mere visual inspection of the air cleaner whether it is clogged and needs replacement.

Thus, it is an object of the present invention to provide a simple visual means of determining when an air cleaner is clogged and should be replaced.

In the past, mechanical air restriction indicators or gauges were provided to determine when an air cleaner was clogged by indicating a restriction to the flow of air through the cleaner. Unfortunately, these devices were not always satisfactory since they were relatively complicated devices, subject to mechanical failure, and additionally were rather expensive.

Accordingly, it is another object of the invention to provide an improved air restriction or vacuum gauge to determine, without removing the air cleaner, when the air cleaner is clogged and should be replaced.

It is still another object of the invention to provide an air restriction indicator that is simple in design, relatively foolproof and free from mechanical failure.

A further object of the invention is to provide a simple air restriction gauge to determine restriction in air flow through an air cleaner, the gauge being relatively simple in design for ease and low cost of manufacture.

Yet another object of the invention is to provide an improved air restriction indicator having signal means that warns a tractor operator with a buzzing sound, signal light or other electrically actuated signal that the tractor air cleaner requires replacement.

These and other objects of the invention pertaining to the particular structure and arrangements whereby the above objects are obtained will be better understood by reference to the following disclosure and drawings, forming a part thereof, wherein:

Description of the drawings

FIG. 1 is a somewhat schematic representation of an air restriction gauge constructed in accordance with the invention and connected to the air induction system of an associated tractor engine below an engine air cleaner;

FIGS. 2 and 3 are front and side elevational views of one embodiment of the air restriction gauge;

FIGURE 4 is an enlarged sectional view taken along the line 4—4 of FIG. 2;

FIG. 5 is a fragmentary rear elevational view on an enlarged scale of the air restriction gauge illustrated in FIGS. 2–4;

FIG. 6 is a sectional view taken along the line 6—6 of FIG. 5 showing details of a release valve mechanism of the invention;

FIGS. 7 and 8 are front and rear elevational views of another embodiment of the invention;

FIG. 9 is a sectional view taken along the line 9—9 of FIG. 8.

Description of the preferred embodiment

Referring to the drawings, FIG. 1 shows an air restriction indicator or vacuum gauge 10 for measuring vacuum increases or changes in pressure, the gauge being constructed in accordance with the invention and secured to the dashboard 12 of a tractor or other powered vehicle. A connecting hose 14 is provided, communicatively connecting the air restriction indicator 10 to an air induction chamber 16 of an associated tractor engine 18, with an air cleaner 20 of the dry paper type positioned on the air induction chamber 16.

The gauge 10, FIGS. 2, 3, includes a body portion 22, a front panel or cover portion 24 and an intermediate panel 26. FIG. 4, defining therebetween an upper safety chamber 28, a lower reservoir chamber 30 for an indicating fluid 31, and a calibrated sight tube or connecting passageway 32 communicatively connecting the upper chamber 28 with the lower chamber 30. Both upper and lower chambers 28, 30 are relatively larger in volume than the volume of the indicating fluid to be contained.

The body portion 22 includes upper and lower flanges 34, 36 having openings 38, 40 therein for receipt of appropriate fastening means for securement of the gauge to a tractor dashboard or other appropriate mounting surface. A vent opening 42 having dust filter means 44 therein is provided at a lower portion of the body 22 for the intake of air at atmospheric pressure into the gauge. An exhaust opening 46 having an outlet tube 48 secured therein is provided at an upper portion of the body 22 for receipt of appropriate connections, as suggested by the tubing 14, to an engine air induction system or other source of vacuum or pressure differential.

The intermediate panel 26, FIG. 4, has upper and lower openings 50, 52, the lower opening 52 communicating the lower reservoir chamber 30 with the sight passageway 32, and the upper opening 50 positioned at an upper portion of the upper chamber 28 communicating the sight passageway 32 with the upper chamber 28. A vertically extending grooved or depressed area 54, FIG. 6, is provided in the intermediate panel 26 defining the sight passageway 32 when positioned adjacent the cover portion 24.

The front panel 24, FIG. 2, has a transparent sight or viewing window 56 which may be appropriately marked with calibration markings. The front and intermediate panels 24, 26 are conventionally secured together and to the gauge body 22 as by cementing or heat sealing along their peripheries to define the upper and lower chambers 28, 30 and the interconnecting sight passageway 32.

In accordance with another important feature of the invention, FIG. 4, manually operable release or dump valve means 58 is provided, directly connecting the upper and lower chambers 28, 30. Referring now to FIGS. 5, 6, the dump valve means 58 includes a release valve member 60, a spring 62 and a spring retainer 64. The release valve member 60 includes a pair of horizontally positioned forwardly extending arms 66 and a transverse connecting portion 67 having a central forwardly extending cylindrical portion 68.

The body portion 22, FIG. 6, has a cut out portion 70 positioned at about the vertical center of the body and adapted to receive the central cylindrical portion 68 of the release valve member which extends forwardly in the same direction as the spaced arms 66 with respect to the transverse connecting portion 67 of the release valve member. The central portion 68 has a rear opening 74 therein for receipt of the spring 62; and the central portion 68 has a flat forward face 75 which is adapted to fit sealingly against a complementally flat rear portion 76 of the valve body to close off a pair of openings 78, 79, FIG. 4, communicatively connecting the upper and lower chambers 28, 30 when said forward face 75 is moved apart from said rear portion 76.

The spring retainer 64, FIGS. 5, 6, has a center portion 80 and a pair of outer holding portions 81, 83. The center portion 80 is adapted to fit in operating position within the opening 74 in the transverse connecting portion 67 of the release valve button. The outer holding portions 81, 83, FIG. 4, are adapted to fit within upper and lower grooves 82, 84 provided for that purpose in the body portion to maintain the spring 62 in biasing position within the opening 74 where the spring biases the release valve member 60 forwardly to bring the forward face 75 into sealing contact with the rear portion 76 closing off the openings 78 and 79 and effectively blocking communication of chambers 28 and 30.

Having now described the invention, its operation should be clear. The gauge, FIG. 4, includes an indicating fluid, such as mercury, for example, maintained during normal engine operation with a relatively unclogged air cleaner within the lower reservoir chamber 30 below the level of the vent opening 42, with the gauge connected to the engine air induction system. As the air cleaner becomes clogged with dirt and dust particles, the cleaner restricts the flow of air into the induction chamber and creates a vacuum in the induction system which is in communication with the upper reservoir. The vacuum tends to draw the indicating fluid upwardly in the sight passageway 32 which may be conventionally calibrated to indicate a clogged air cleaner. As the vacuum increases, the indicating fluid is drawn through the opening 50 into the upper chamber 28 which holds the indicating fluid therein and prevents it from being drawn through exhaust opening 46 and line 14 into the induction system of the engine, the chamber 28 being sufficiently large to contain all of the indicating fluid below the level of the exhaust opening 46.

The release valve means 58 normally blocks communication between the upper chamber and the lower chamber and prevents the indicating fluid from flowing into the lower chamber.

Thus, when an associated air cleaner is clogged, the indicating liquid will be drawn completely out of the bottom reservoir and the sight passageway will be noticeably empty and clear of indicating fluid. This will be apparent to the tractor operator during operation or during pre-operation maintenance of the tractor. The release valve arms 66 extend forwardly on either side of the gauge body and protrude slightly from an associated mounting panel to serve as release buttons. When the tractor operator has replaced the clogged air cleaner with a clean one, the indicating fluid is released to the lower chamber merely by pressing the forward button portions of arms 66.

Signal means is provided in the gauge for more directly calling the attention of the operator to the fact that the air cleaner is dirty and includes electrical upper and lower contacts 84, 86, FIG. 4, and electrical lead wires 88, 90, FIG. 2, connected to the contacts for connection to conventional signal means such as for instance, a signal light 91, FIG. 4, or an electrical buzzer not shown. Thus, when the indicating fluid within the valve rises within the sight passageway to a predetermined point, making contact with the upper electrical contact, an electrical circuit is completed and a visual or auditory signal is given to the tractor operator.

FIGS. 7–9 illustrate a modification of the embodiment of the invention illustrated in FIGS. 2–6 wherein like parts are designated by like numerals with the addition of the suffix *a*. The valve includes upper and lower chambers 28a, 30a, and an intermediate calibrated sight tube or passageway 32a communicatively connecting the upper and lower chambers by means of a lower opening 52a and an upper opening 92 provided at the base or lower portion of the upper chamber 28a, the transparent sight tube 32a revealing indicating fluid contained in the lower chamber 28a and in the lower portion of the sight tube during normal operation. The upper chamber 28a has an outlet 46a positioned above the level to which the indicating fluid may rise in the upper chamber for connection of the gauge 10a by appropriate means such as the outlet tube 14a to the induction system of an internal combustion engine. Electrical contacts 84a, 86a connected to leads 88a, 90a are provided within the sight tube at upper and lower locations within the sight tube for connection to an appropriate electrical signal device 91a, FIG. 7.

During normal operation, indicating fluid is maintained within the lower reservoir. As an associated air cleaner becomes clogged, it restricts the flow of air into the engine induction system in communication with the gauge 10a creating a vacuum which draws the indicating liquid upwardly through the sight tube 32a and opening 92 into the upper chamber 28a. The upper chamber 28a acts as a safety chamber to prevent indicating fluid from being drawn into the outlet tube 14a and the induction system of the engine by providing more space than required to hold the indicating fluid. At an excessively high vacuum indicating a clogged air cleaner, the vacuum draws the indicating fluid into the safety chamber 28 and concurrently draws air through vent opening 42a into connecting passageway 32a, safety chamber 28a, and into the induction system of the engine. The air drawn into the upper chamber 28a creates a turbulent or boiling condition of the indicating liquid within the safety chamber 28a which is clearly visible to an operator indicating the need for replacement of the air cleaner.

The sight passageway 32a normally acts as a seal between the upper and lower chambers preventing entrance of air from vent opening 42a into the upper chamber; this seal is broken by indicating fluid being drawn into the upper chamber, the induction chamber vacuum drawing air through the fluid and connecting line 14a. The fluid is trapped within the upper safety chamber 28a so long as the vacuum continues and cannot be lost or drawn into the induction system of the engine. When the tractor engine is not operating, the indicating fluid merely drops from the upper chamber into the lower chamber.

Since modifications of the details of the structure as illustrated in the various figures are contemplated, the invention should be limited only by the scope of the appended claims. Thus, while the connecting sight passageway has been shown in a substantially vertical position, it should be clear that a sight passageway arranged at an inclination to the horizontal is within the teachings of the invention.

The invention is claimed as follows:

1. In a gauge having means providing a first fluid chamber having means defining a vent to the atmosphere, an indicating fluid within said fluid chamber and means providing a sight passageway having a first and second end, said sight passageway first end being connected to said first fluid chamber, said second end being adapted for connection to a source of pressure differential, the improvement comprising:

means defining a second fluid chamber connected to said second end of said sight passageway, said second chamber defining means being interconnected between said second end of said passageway and the source of pressure differential, the second end of said sight passageway and the source of pressure differential being spaced apart whereby fluid is prevented from being exhausted from said gauge into the source of pressure differential.

2. A gauge for measuring changes in pressure from a source of pressure differential comprising:

means providing a sight passageway having a first end and a second end, means providing first and second fluid chamber, said first fluid chamber being connected at a lower portion thereof to said first end of said sight passageway, said second fluid chamber being connected at a lower portion thereof to said second end of said sight passageway, an indicating fluid having a volume relatively less than the volume of either said first or second fluid chamber, said first chamber having a first outlet opening defining a vent therein, said second chamber having a second outlet opening therein, said openings being above the level to which said indicating fluid may rise in said chambers, said second outlet openings being connected to said source of pressure differential.

3. In a vacuum gauge for measuring restriction to the flow of air through an associated engine air cleaner to the air induction system of an engine, said gauge including a first chamber having means defining a vent opening therein, a sight tube in communication therewith, outlet means connecting said sight tube communicatively with said engine induction system, and an indicating fluid normally contained within said first chamber, the improvement comprising:

means defining a second chamber in fluid communication between said sight tube and said induction system the second chamber so formed below the outlet means to contain the indicating fluid below the level of said outlet means, whereby as said air cleaner becomes clogged restricting the flow of air therethrough and creating a vacuum in said induction system, indicating fluid is drawn from said first chamber through said sight tube into said second chamber permitting a flow of air through said vent opening and sight tube said second chamber providing a space between said sight tube and said air induction system whereby indicating fluid is prevented from being drawn into said air induction system.

4. In a vacuum gauge including a reservoir chamber and means defining a sight passageway, said reservoir chamber having vent means to the atmosphere, said sight passageway having first and seconds ends and being connected communicatively to said reservoir chamber at its first end and being adapted for communication to an associated air induction system at said second end, the improvement comprising:

means providing a second unvented chamber connectively interposed between said air induction system and said sight passageway, said second chamber being of such size to hold said indicating fluid and provide additional space to prevent said fluid from being drawn by said source of vacuum into said air induction system.

5. The improved vacuum gauge of claim 4 and including electrical signal means for indicating when the vacuum in said vacuum source has exceeded a predetermined amount, said means including first and second electrical contacts, said first electrical contact being positioned below the level of fluid in said reservoir chamber under normal operating conditions, said second contact being positioned at a predetermined level in said sight tube whereby when increases in vacuum from said vacuum source draw said indicating liquid to said predetermined level in said sight tube to make contact with said second electrical contact an electrical signal circuit is completed to provide an electrical signal.

6. In a vacuum gauge including means for providing a reservoir chamber and means defining a sight passageway, said reservoir chamber holding an indicating liquid and having a vent passage to the atmosphere, said sight passageway having first and second ends and being connected communicatively to said reservoir chamber at its first end and being adapted for connection to an associated air induction system at said second end, the improvement comprising:

means for providing an unvented chamber connectively interposed between said air induction system and said sight passageway, said connection between said sight passageway and said second chamber being at an upper portion of said second chamber above the level of indicating fluid therein; and valve means connecting said chambers, said valve means including means providing a second passageway between said first and said second chamber, a stopper biased by a spring to block the flow of indicating fluid through said second passageway and including manually operable release button means to manually overcome the spring to open said second passageway, whereby when said indicating fluid is maintained in said second chamber indicating that said vacuum source has exceeded a predetermined amount of vacuum, said indicating fluid may be reelased to said reservoir chamber by depressing said release button means to overcome said spring and open said passageway between said first and second chambers.

7. A vacuum gauge comprising upper and lower fluid chambers, means defining a sight passageway interconnecting said chambers, and indicating fluid normally maintained in said lower chamber, said lower chamber having a vent opening therein, said vent opening being above the level of fluid in said chamber, said upper chamber having an opening at an upper portion thereof spaced from said sight passageway for connection to a source of vacuum, whereby when vacuum from said vacuum source exceeds a predetermined amount, indicating fluid is drawn from said lower chamber through said sight passageway into said upper chamber, said upper chamber being relatively larger than the volume of said fluid to provide a space over said fluid between said sight passageway and said vacuum source whereby indicating fluid is prevented from escaping into said vacuum source.

8. The vacuum gauge of claim 7 wherein said sight passageway is connected to said upper chamber at an upper portion thereof at a predetermined point above the level to which said indicating fluid will rise when said fluid is drawn into said upper chamber, thereby effectively trapping said liquid in said upper chamber, and normally closed manually operable valve means directly connecting said chambers, said valve means being adapted when manually opened to permit a flow of fluid from said upper chamber to said lower chamber.

References Cited

UNITED STATES PATENTS

| 1,949,627 | 3/1934 | Rockwell | 73—401 |
| 3,173,298 | 3/1965 | Gilmont | 73—401 |
| 785,438 | 3/1905 | Sargent | 200—81.6 |
| 1,638,814 | 8/1925 | Epstein | 200—81.6 |
| 1,685,211 | 9/1928 | Beck | 200—81.6 |
| 1,984,000 | 12/1934 | Sherwood | 73—303 |
| 2,157,135 | 5/1939 | Little et al. | 73—38 |

(Other references on following page)

UNITED STATES PATENTS

| | | | |
|---|---|---|---|
| 2,471,281 | 5/1949 | Olson et al. | 200—81.6 |
| 2,686,425 | 8/1954 | Dietert | 73—38 |
| 2,840,035 | 6/1958 | La Porte | 116—118 |
| 3,024,655 | 3/1962 | Dwyer et al. | 73—209 |
| 3,116,711 | 1/1964 | Hardesty | 116—135 |
| 3,126,739 | 3/1964 | Whitehill | 73—205 |
| 3,172,746 | 3/1965 | Shuck | 55—274 |
| 3,184,957 | 5/1965 | Ellis et al. | 73—38 |
| 3,286,508 | 11/1966 | Spiegel | 73—38 |

LOUIS J. CAPOZI, *Primary Examiner.*

U.S. Cl. X.R.

73—303; 116—117, 118; 200—152